May 14, 1963
C. P. CRAWFORD
3,089,504
VALVE HAVING SELF-CLEANING SEAT
Filed Oct. 28, 1960
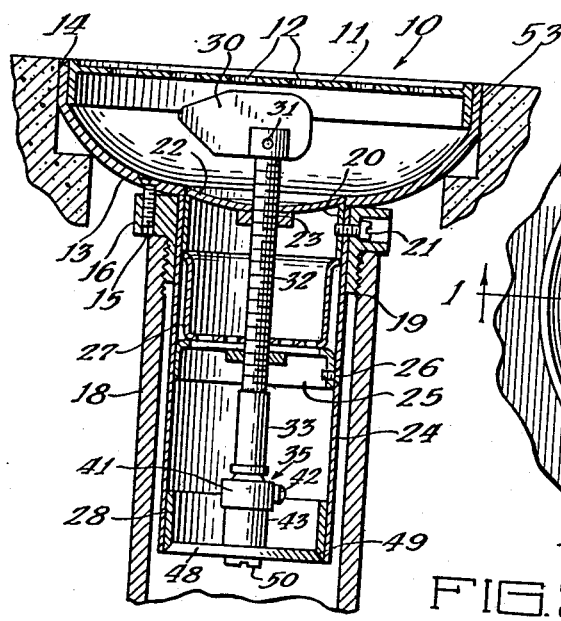
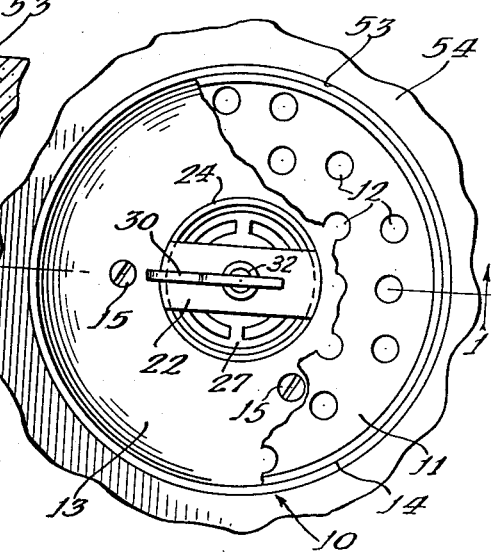
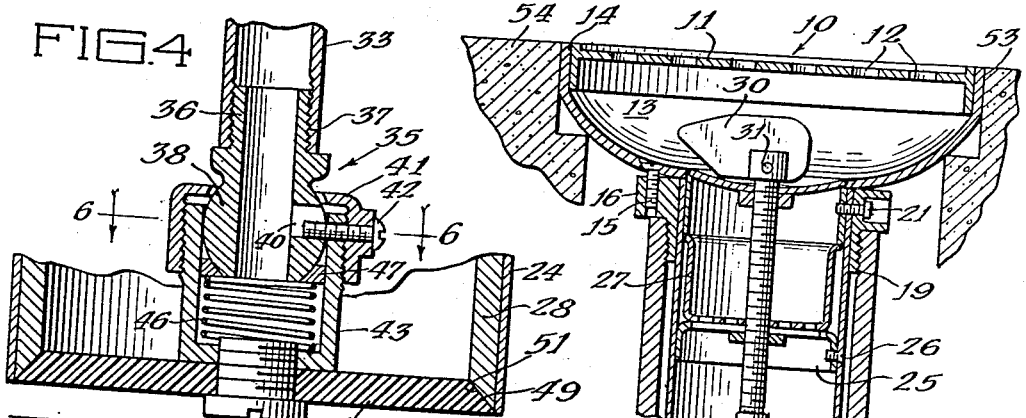
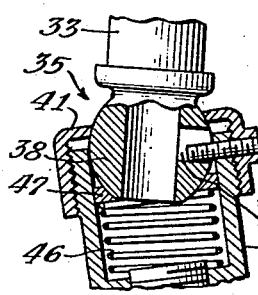
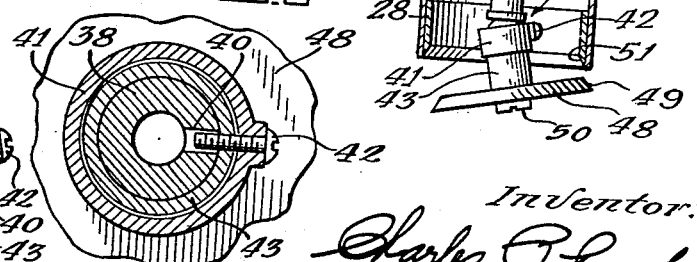
Inventor:
Charles P. Crawford

United States Patent Office 3,089,504
Patented May 14, 1963

3,089,504
VALVE HAVING SELF-CLEANING SEAT
Charles P. Crawford, Room 822, 79 W. Monroe St., Chicago 3, Ill.
Filed Oct. 28, 1960, Ser. No. 57,799
3 Claims. (Cl. 137—242)

This invention relates to improvements in valve construction.

It is an object of my invention to provide a valve having a self-cleaning valve seat.

According to my invention, as the valve is closed, a peripheral portion of the disk-shaped valve member exerts a sweeping motion on the valve seat which removes any foreign matter which may have accumulated thereon.

The invention is particularly useful in connection with basement floor drains because the dirt or sediment which is carried by the water as it flows through the drain is likely to prevent proper seating of the disk-shaped valve member.

The various features of novelty whereby my present invention is characterized will be hereinafter pointed out, with particularity in the claims; but for a full understanding of the invention and its various objects and advantages, reference may be made to the following detailed descriptions taken in connection with the accompanying drawings wherein:

FIGURE 1 is a cross sectional view taken along line 1—1 of FIGURE 2;

FIGURE 2 is a plan view;

FIGURE 3 is a cross sectional view similar to FIGURE 1, but shown in a changed position;

FIGURE 4 is an enlarged fragmentary view of the construction of the seating arrangement of the valve;

FIGURE 5 is a fragmentary view of part of the construction shown in FIGURE 4 in a changed position;

FIGURE 6 is a section taken along the line 6—6 of FIGURE 4.

As shown in FIG. 1, the valve 10 comprises a valve stem 33 carrying at its lower end a valve member 48 which cooperates with a valve seat 28. The valve stem is centrally positioned with respect to a body assembly which includes a threaded mounting flange 16, a tubular member 24, and a stem supporting bridge 22. The valve seat 28 is carried at the lower end of the tubular member 24. The stem supporting bridge 22 is provided with a nut 23 which receives the threaded shank 32 of valve stem 33. The stem supporting bridge 22 is mounted on a support sleeve 20 received within the tubular member 24, the parts 16, 24, and 20 being secured to each other by one or more set screws 21.

The body assembly is received within the threaded end 19 of a drain pipe 18 or the like by virtue of the cooperation between the threaded flange 16 and the screw threads 19.

As applied to a floor drain, the valve installation also includes a bell-shaped member 13 which is secured to the mounting flange 16 by screws 15, the whole assembly being received within an opening 53 in the cement of the basement floor 54. The threaded shank 32 of the valve stem 33 extends into the bell 13 and is provided with a key 30 for operating the same, the key being secured to the threaded shank of the valve stem 33 by a pin 31. The upper end of the bell is provided with a drain cover 11 having apertures 12 therein.

A basket strainer 27 is supported within the tubular member 24 by a flanged support 25 secured in place by a set screw 26. Thus, a drain structure is provided which is flush with the floor 54 and which includes valve mechanism which is operated by rotation of the key 30, after the drain cover 12 has been removed.

The self-cleaning feature of the valve includes a hinge device 35 located at the lower end of the valve stem 33 and providing an articulated joint between the valve stem and the valve member 48. As shown in FIG. 4, the hinge device 35 includes two telescopically arranged elements, an inner element or ball member 38 and an outer element or cup 43. A spring 46 is confined between the two and urges the cup 43 downwardly, but restraining means in the form of a pin or screw 42 is provided at one side of the parts so that the spring 46 will cause the cup 43 to assume the tilted position shown in FIG. 5. The screw 42 also serves as a key so that the cup 43 will rotate with the ball member 38 and stem 33.

The ball member 38 is rigidly connected to the valve stem 33 by means of a threaded shank 36. The cup 43 is connected the valve member 48 by a screw 50. The upper end of the spring 46 bears against a washer 47 having a spherical seal for the ball member 38 so that the washer can accommodate itself to the tilted position of the parts shown in FIG. 5 and permit the spring 46 to maintain a centered position with respect to the cup 43.

The cup 43 is provided with a retaining cap 41, the opening of which is of greater diameter than the diameter of the neck of the ball member 38, as shown in FIG. 4, in order to permit substantial longitudinal movement of the cup 43 with respect to the ball member 38.

The ball member 38 is provided with a slot 40 into which the screw 42 extends, thus providing both the keyed connection above mentioned and also the restraining action at one side.

For instance, when the stem 33 and valve member 48 are drawn upwardly, as shown in FIG. 4, the lower edge of the slot 40 engages the set screw 42 to urge the valve member 48 upwardly into valve closed position. When the stem 33 is screwed downwardly as shown in FIG. 5, the set screw 42 will still engage the lower edge of the slot 40, but the spring 46 will push the unrestrained side downwardly, with the result that the ball member 43 is urged into the tilted position shown in FIGS. 3 and 5.

In operation, when the valve is in its open position, as shown in FIG. 3, the valve member 48 is tilted. The valve is closed by rotating the stem 33 by the key 30. This draws the valve member upwardly as it is rotated, until a peripheral portion 49 of the valve member 48 engages the surface 51 of the valve seat 28. Continued rotation of the stem 33 will cause the peripheral portion 49 to sweep over the surface 51 for several complete revolutions. This scrapes dirt and other foreign matter from the surface 51 to provide a self-cleaning action, which permits proper seating and provides a fluid-tight seal.

While I have illustrated and described with particularity only a preferred form of my invention, I do not desire to be limited to the exact details thus illustrated and described; but intend to cover all forms and arrangements that come within the definitions of my invention, constituting the appended claims.

Moreover, it is readily understood that this valve as shown has many other uses, such as containers of various sizes and shapes to safeguard all highly volatile vapors, liquids, gaseous products and also all of the new highly concentrated liquid explosives. Furthermore, it can be adapted to automobile tappets to function as an integral part in keeping the valve seat free from the usual accumulation of carbon.

I claim:

1. A valve having a self-cleaning valve seat and adapted for use in drains or the like comprising a body assembly, a valve seat mounted on said body assembly, a rotatably mounted valve stem extending through said body assembly and cooperating therewith in screw threaded relationship to impart axial movement to said valve stem, a valve member carried by said valve stem and rotating therewith, a hinge device connecting said valve member and said valve stem, and spring means biasing said valve member into a tilted position when said valve member is in its open position so that a peripheral portion of said valve member will engage said valve seat and exert a sweeping motion thereon as said valve stem is rotated into valve closed position in order to clean said valve seat.

2. A valve as claimed in claim 1 in which said hinge device comprises a cup, a ball member extending into said cup, said ball member having a slot formed in its side surface, a restraining pin mounted on the wall of said cup and extending into said slot, a retainer cap mounted on said cup, said spring being disposed in said cup and bearing against said ball member.

3. A valve having a self-cleaning valve seat comprising a body assembly, a valve seat mounted on said body assembly, a rotatably mounted valve stem extending through said body assembly and coopearting therewith in screw threaded relationship to impart axial movement to said valve stem, a valve member carried by said valve stem, a cup-shaped outer member mounted on said valve member, an inner member mounted on said valve stem and extending into said cup-shaped outer member, a slot formed in one side surface of said inner member, means projecting from the wall of said cup-shaped outer member and extending into said slot to provide a non-rotatable connection between said inner member and said cup-shaped outer member and to limit axial movement of said cup-shaped outer member along one side only, and a compression spring confined between the end of said inner member and the bottom of said cup-shaped outer member whereby said spring will cause said cup-shaped outer member to assume a tilted position as said valve member is axially displaced into its open position, said spring urging a peripheral portion of said valve member into engagement with said valve seat so as to exert a sweeping motion thereon as said valve member and valve stem are rotated in order to clean said valve seat.

References Cited in the file of this patent
UNITED STATES PATENTS

| 1,747,442 | Hutchings | Feb. 18, 1930 |
| 1,771,770 | Bruno | July 29, 1930 |
| 1,827,911 | Root | Oct. 20, 1931 |
| 2,348,097 | Smith | May 2, 1944 |
| 2,478,976 | Modlin | Aug. 16, 1949 |
| 2,889,849 | Shohan | June 9, 1959 |

FOREIGN PATENTS

| 672,394 | England | May 21, 1952 |